(12) United States Patent
Bosco et al.

(10) Patent No.: US 9,539,938 B1
(45) Date of Patent: Jan. 10, 2017

(54) REMOVABLE VEHICLE ROOF PANEL WITH STOWING ASSISTANCE LAMPS

(71) Applicant: GM GLOBAL TECHNOLOGY OPERATIONS LLC, Detroit, MI (US)

(72) Inventors: Anthony A. Bosco, Macomb, MI (US); Robert A. Dziurda, Waterford, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 14/960,621

(22) Filed: Dec. 7, 2015

(51) Int. Cl.
*B60J 7/11* (2006.01)
*B60Q 3/02* (2006.01)
*B60J 7/10* (2006.01)

(52) U.S. Cl.
CPC ............ *B60Q 3/0209* (2013.01); *B60J 7/106* (2013.01)

(58) Field of Classification Search
CPC ............... B60J 7/08; B60J 7/10; B60J 7/106; B60J 7/11
USPC .......................... 296/218; 362/490, 493, 503
See application file for complete search history.

(56) References Cited

U.S. PATENT DOCUMENTS

| | | | |
|---|---|---|---|
| 3,635,518 A * | 1/1972 | Eger | B60J 7/20 224/557 |
| 4,367,454 A * | 1/1983 | Modica | B60J 7/194 180/286 |
| 4,467,944 A * | 8/1984 | Manko | B60J 7/20 224/311 |
| 4,630,029 A * | 12/1986 | Hayward | B60Q 1/2611 296/218 |
| 4,718,710 A * | 1/1988 | Iwamura | B60J 7/11 248/220.21 |
| 5,193,874 A * | 3/1993 | German | B60J 7/20 206/454 |
| 5,725,273 A * | 3/1998 | Vernon | B60J 7/201 224/315 |
| 6,926,330 B2 * | 8/2005 | Scholz | B60J 7/206 296/218 |
| 7,032,964 B2 * | 4/2006 | Kirk | B60J 7/20 211/41.1 |
| 7,494,255 B2 * | 2/2009 | Bryan | B60Q 3/025 362/470 |

* cited by examiner

*Primary Examiner* — Dennis H Pedder
(74) *Attorney, Agent, or Firm* — Quinn Law Group, PLLC

(57) ABSTRACT

A removable roof panel for a vehicle body having a compartment includes an outer panel, a perimeter frame connected to the outer panel and having a first locator feature configured to engage a second locator feature of the compartment, and latching handles operatively connected to the perimeter frame, and operable for latching and unlatching the perimeter frame from the vehicle body. The roof panel includes a lamp connected to the perimeter frame proximate the first locator feature, a battery electrically connectable to and operable for energizing the lamp, and a lamp actuator. The lamp actuator is configured to selectively connect the lamp to the battery when the removable roof panel is removed from the vehicle body to thereby illuminate the first and second locator features during stowing of the removable roof panel in the compartment. A vehicle includes the vehicle body and the removable roof panel.

17 Claims, 3 Drawing Sheets

US 9,539,938 B1

REMOVABLE VEHICLE ROOF PANEL WITH STOWING ASSISTANCE LAMPS

TECHNICAL FIELD

The present disclosure relates to a removable vehicle roof panel with stowing assistance lamps.

BACKGROUND

A vehicle body typically includes a roof that is supported by pillars. In a convertible vehicle, the roof may be automatically retracted and stowed behind the driver or behind a row of seats. In other convertible designs, the roof may include a removable roof panel that may be unlatched and removed from the vehicle body as a solid unit. Thereafter, the roof panel may be temporarily stowed in a protected area such as a garage or in a compartment of the vehicle.

SUMMARY

The present disclosure pertains to a removable roof panel for use with a vehicle body defining a compartment, e.g., a rear compartment or trunk. The roof panel has a first set of locator features, such as ball studs or posts, and lamps positioned in proximity to the first set of locator features. The lamps are selectively illuminated for a calibrated duration when the roof panel is unlatched and removed from the vehicle body. Illumination provided by the lamps is intended to assist an operator of the vehicle in properly orienting and stowing the roof panel within the compartment. That is, each of the lamps is positioned so as to illuminate a respective second locator feature of the compartment, such as a slotted receiver, with the first and second locator features configured to engage one another and thereby locate an edge of the roof panel during stowing of the roof panel in the compartment.

The second locating feature may reside within a pocket of the compartment, and is therefore largely out of view of the operator when the operator is attempting to stow the roof panel. That is, as the operator inserts the roof panel in a downward direction into the pocket of the compartment, a trailing edge of the roof panel is positioned in the pocket. A floor of the compartment and the roof panel, when the roof panel is in a stowed position, may form an obtuse angle with respect to a rear surface of the vehicle body. As a result, the lamps are required to illuminate the locator features and ensure proper stowing of the roof panel, as the locator features during stowing may be substantially out of a field of view of the operator.

In a particular embodiment, a removable roof panel for a vehicle body having a compartment includes an outer panel, a perimeter frame, latching handles, a lamp, a battery, and a lamp actuator. The perimeter frame, which is connected to the outer panel, includes a first locator feature configured to engage a second locator feature of the compartment during stowing of the roof panel in the compartment. The latching handles are operatively connected to the perimeter frame, and are operable for latching and unlatching the perimeter frame from the vehicle body. The lamp is connected to the perimeter frame proximate the first locator feature. The battery is electrically connectable to and operable for energizing the lamp. The lamp actuator selectively connects the lamp, or multiple lamps, to the battery when the removable roof panel is removed from the vehicle body to thereby illuminate the first and second locator features during stowing of the removable roof panel in the compartment.

A vehicle is also disclosed that includes a vehicle body and a roof panel as set forth above.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
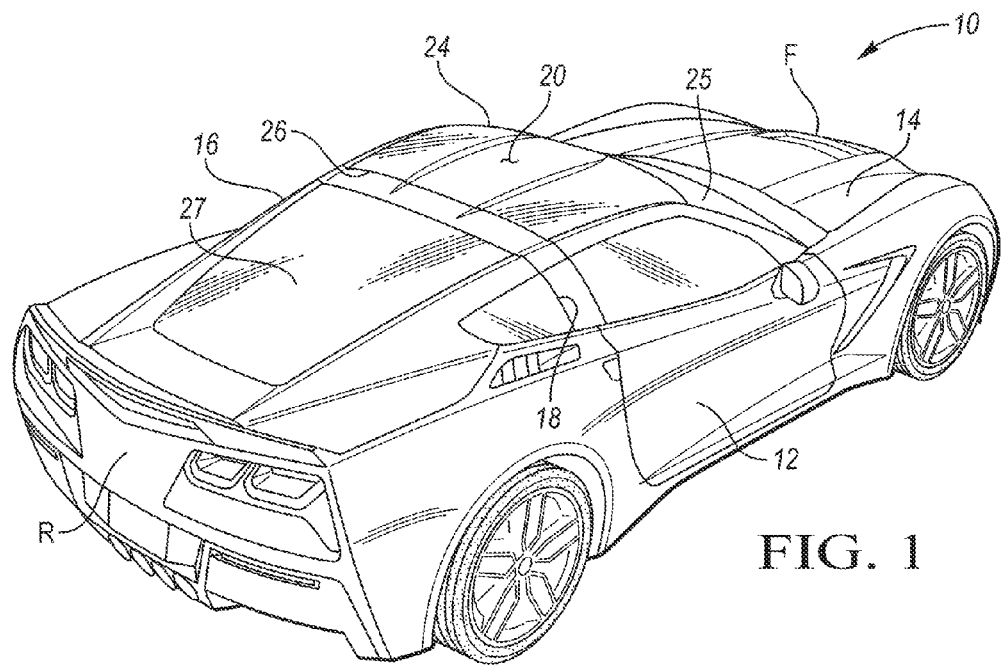
FIG. 1 is a schematic perspective view illustration of an example vehicle having a removable roof panel constructed as set forth herein.
Figure 4:
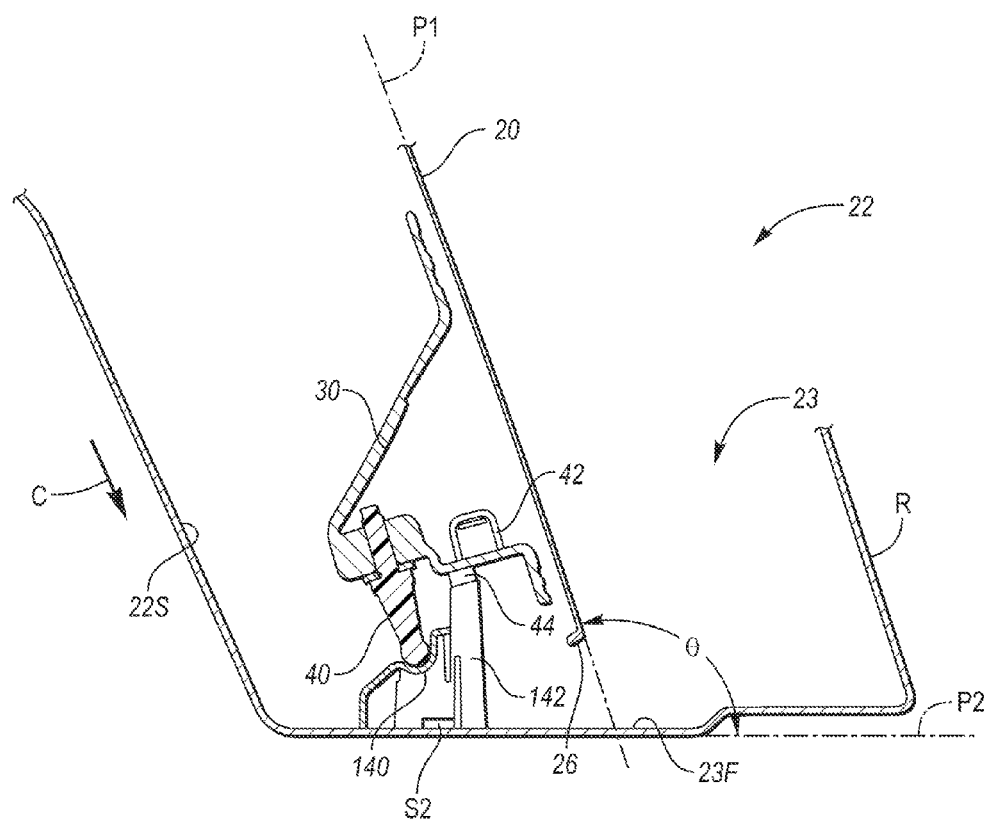
FIG. 4 is a schematic cross-sectional illustration of the compartment and removable roof panel of FIGS. 1 and 2.

Referring to the drawings, wherein like reference numbers refer to like components, an example vehicle 10 is depicted schematically in FIG. 1. The vehicle 10 includes a vehicle body 12 having a front end (F) and a rear end (R), with "front" and "rear" defined herein with respect to a normal forward driving position. The vehicle body 12 defines a passenger compartment 14 and a closure 16, e.g., a hatchback door or a trunk lid covering a compartment 22 as shown in FIGS. 2 and 4.

The vehicle body 12 may also include pillars 18 supporting a removable roof panel 20 that is stowable within the compartment 22 and configured as described below with reference to FIGS. 2-4. The roof panel 20 spans the passenger compartment 14 and includes a forward edge 24 and a trailing edge 26. In the installed position shown in FIG. 1, the forward edge 24 is located adjacent to a windshield 25 toward the front end (F), while the trailing edge 26 is adjacent to a rear window 27 at the rear end (R).

Figure 2:
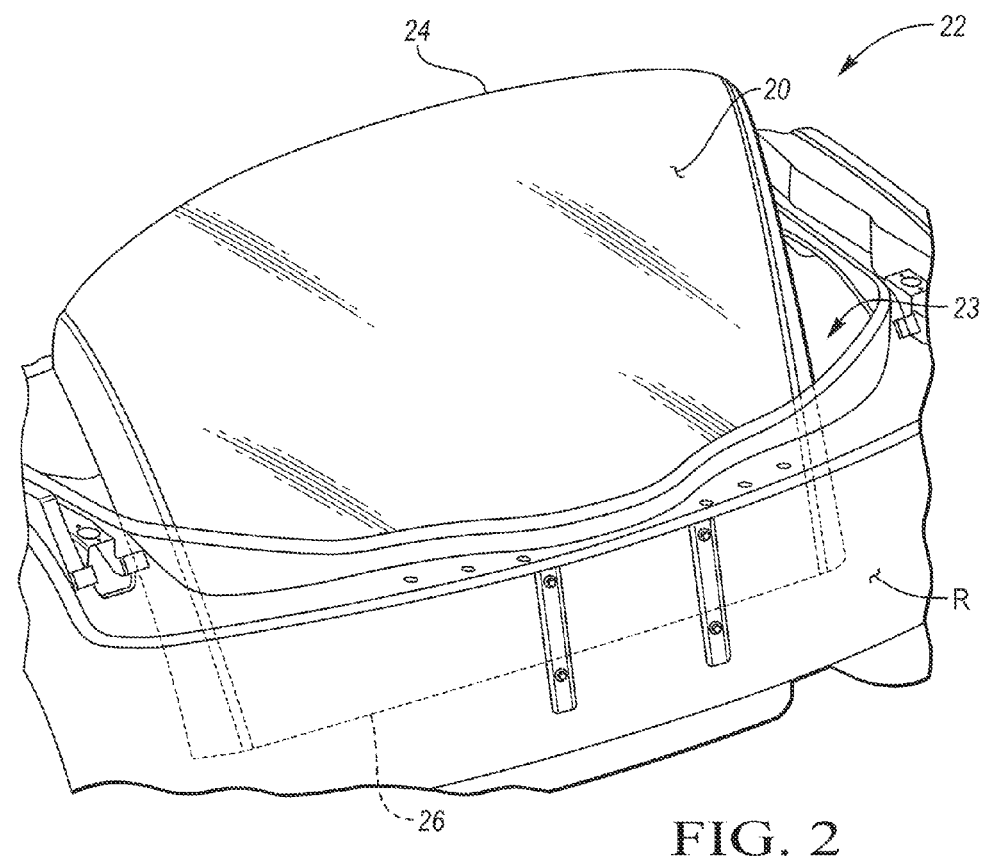
FIG. 2 is a schematic perspective view illustration of a compartment and removable roof panel of FIG. 1 in a stowed position.

FIG. 2 depicts a stowed position of the roof panel 20. The rear closure 16 of FIG. 1 can be opened to provide access to the compartment 22. When the roof panel 20 is unlatched and removed from the vehicle body 12 of FIG. 1, the roof panel 20 can be optionally stowed within a designated area of the compartment 22 in the position shown and transported within the vehicle 10. From a perspective of an operator standing at the rear end (R) of the vehicle 10, the removable roof panel 20 may tilt or lean away from the operator. The forward edge 24 is thus oriented upward and angled away from the rear end (R) of the vehicle 10 when the roof panel 20 is in the stowed position of FIG. 2. The trailing edge 26 is positioned within a designated area in the form of a pocket 23 of the compartment 22, which is also shown in FIG. 4.

Figure 3:
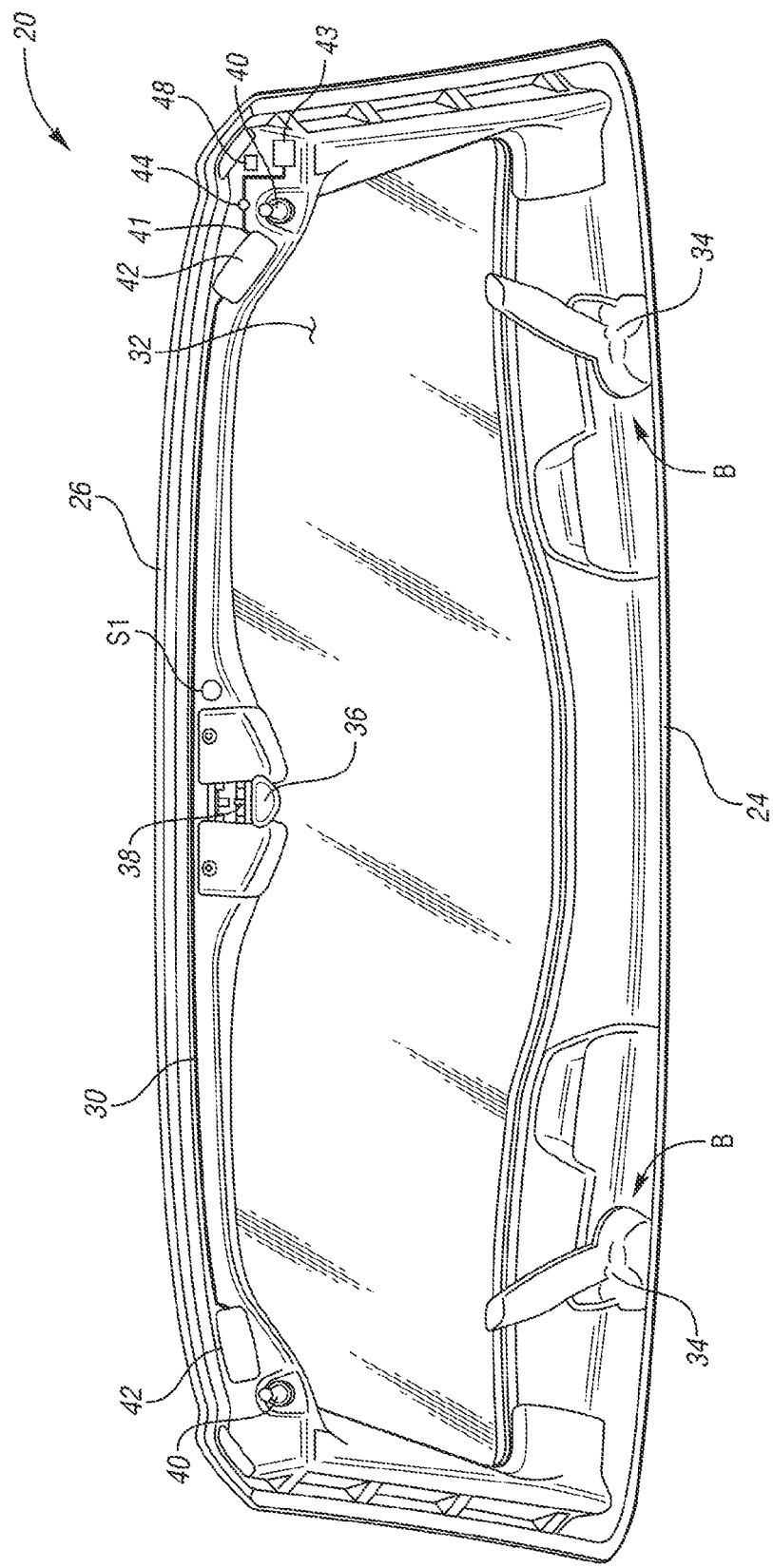
FIG. 3 is a perspective view illustration of an underside of the removable roof panel of FIGS. 1 and 2.

FIG. 3 depicts the underside of the roof panel 20 in a possible embodiment. The roof panel 20 includes a perimeter frame 30 and an outer panel 32, with the latter bonded or otherwise connected to the perimeter frame 30 such that the perimeter frame 30 supports the outer panel 32 from below when the roof panel 20 is in the installed position of FIG. 1. In possible embodiments, the perimeter frame 30 may be constructed of magnesium, aluminum, carbon fiber, or another sufficiently high-strength/low weight material, with the outer panel 32 constructed of polycarbonate, fiberglass, or sheet molded compound in various non-limiting example embodiments.

Example latching handles 34 are located on the perimeter frame 30 adjacent to the forward edge 24, i.e., within easy reach of a driver of the vehicle 10 of FIG. 1. The latching handles 34 may be rotated as indicated by arrows B to partially unlatch the roof panel 20 from the vehicle body 12 of FIG. 1 along the forward edge 24. A latch release button 36 adjacent to the trailing edge 26 of the roof panel 20 may be depressed by an operator of the vehicle 10 to release a latching mechanism 38 from a mating feature (not shown), e.g., an anchor or bar connected to the vehicle body 12, to complete unlatching of the roof panel 20.

As noted above with reference to FIG. 2, the roof panel 20, when properly stowed within the compartment 22, is oriented such that the trailing edge 26 of the roof panel 20 enters the pocket 23 shown in FIG. 4. To facilitate stowing of the roof panel 20, the perimeter frame 30 is equipped with a first locator feature 40, e.g., a set of ball studs or posts, which engage or mate with a second locator feature 140 located at the bottom of the pocket 23 as explained below with reference to FIG. 4. The roof panel 20 also includes one or more lamps 42 positioned in close proximity to the first locator features 40.

The lamps 42, which may be powered via a battery 43, are automatically illuminated for a calibrated duration when the roof panel 20 is removed from the vehicle body 12 of FIG. 1. The lamps 42 are sufficiently positioned so as to illuminate the second locator feature 140 in the compartment 22, with the first and second locator features 40 and 140 configured to engage one another and thereby facilitate location by the operator of the trailing edge 26 within the pocket 23 when the roof panel 20 is in the process of being stowed.

The lamps 42 may be embodied as light-emitting diodes (LEDs) in an example embodiment. The color of the LEDs may be predetermined, e.g., white or red, so as to provide the best possible illumination in low lighting conditions. Other lighting devices may also be used in other embodiments, such as but not limited to incandescent lights, LED light pipes, or halogen lights, without departing from the intended inventive scope. Optionally, color-changing LEDs may be used as the lamps 42, with the lamps 42 illuminating in a first color such as red when the roof panel 20 is first removed from the vehicle body 12 and changing to a second color, e.g., white or green, when the roof panel 20 is in a predetermined position or orientation with respect to the compartment 22 of the vehicle body 12 or with respect to the pocket 23 of FIG. 4, with such an option possibly entailing proximity sensing of the roof panel 20 via sensors S1 and S2 as explained below, with sensor S2 shown in FIG. 4, and a microcontroller 48 in communication with the sensors S1 and S2 operable for activating LEDs of a particular color, e.g., red, blue, and/or green within the lamp 42, as is well known in the art.

A lamp actuator 44 of FIG. 3 may be integrated into the material of the perimeter frame 30. The lamp actuator 44 may be embodied as a switch and/or one or more sensors collectively operable for activating the lamps 42 only when the roof panel 20 has been fully unlatched and removed from the vehicle body 12 of FIG. 1. For example, the lamp actuator 44, in a simple illustrative embodiment, may be a spring-loaded button switch similar to the type conventionally used to activate a dome light in a refrigerator or vehicle interior. In such an embodiment, the lamp actuator 44 may be fully depressed when the roof panel 20 is in the installed position of FIG. 1, with structure of the vehicle body 12 adjacent to the perimeter frame 30 at or along the trailing edge 26 depressing the lamp actuator 44 to thereby open an electrical circuit 41 between the lamps 42 and the battery 43.

When the roof panel 20 is removed from the vehicle body 12, the same electrical circuit 41 may automatically close, thereby electrically connecting the battery 43 to the lamps 42. The lamp actuator 44 may be closed via contact with a surface of the compartment 22, thereby turning off the lamps 42 when the roof panel 20 has been properly stowed as shown in FIG. 2. An optional timer of the type known in the art may be used to limit a duration of illumination of the lamps 42 to an amount of time sufficient for an operator to move the roof panel 20 to the compartment 22 of the vehicle 10 and stowing the roof panel 20 therein, thus helping to preserve the state of charge of the battery 43. In such an embodiment, the lamps 42 may be used to help illuminate a path of an operator as the roof panel 20 is carried around the vehicle 10 for stowing in the compartment 22.

While the use of a passive switch as the lamp actuator 40 is described above, actively controlled embodiments of the lamp actuator 44 may be readily envisioned within the intended scope of the disclosure. For instance, the perimeter frame 30 and compartment 22 may be equipped with proximity sensors S1 and S2 which detect the position and/or orientation of the roof panel 20. That is, the sensor S1 may be an emitter that is activated by state of the lamp actuator 44 when the roof panel 20 is first removed from the vehicle body 12. In such an embodiment, the sensor S2 located in the compartment 22 as shown in FIG. 4 may detect close proximity of the sensor S1, or vice versa, delaying illumination of the lamps 42 until the roof panel 20 is in close proximity of the sensor S2.

If the operator decides not to stow the roof panel 20 in the compartment 22, for instance by instead stowing the roof panel 20 in a garage, the sensors S1 and S2 will not detect the presence of the other, and as a result, the lamps 42 will not illuminate. Other sensor configurations may be envisioned that measure the position and/or orientation of the removable roof panel 20 and do not illuminate the lamps 42 until the removable roof panel 20 is properly oriented with respect to the pocket in the compartment 22, e.g., multi-axis accelerometers, Hall effect sensors, or the like, thereby acting as a light guide in stowing the roof panel 20.

Referring to FIG. 4, a schematic side view illustration of the compartment 22 and the roof panel 20 illustrates the process of stowing the roof panel 20, only a portion of which is shown for illustrative simplicity. Upon removal from the vehicle body 12 of FIG. 1, the roof panel 20 is rotated into the proper angle θ for stowing within the pocket 23. A plane P1 of the roof panel 20 and a plane P2 of a floor 23F of the pocket 23 form an obtuse angle as viewed from the side of the compartment 22 as shown, i.e., the roof panel 20 may lean or tilt away from an operator standing at the rear end (R) of the vehicle 10. The trailing edge 26 is thus oriented facing the floor 23F. As the operator slides the roof panel 20 in the direction of arrow C, the lamps 42 emit light into the pocket 23 to illuminates the first and second locator features 40 and 140, respectively.

In the embodiment of FIG. 4, the first locator features 40 are ball studs or posts, and the second locator features 140 are slotted receivers. As is well known in the art, in such a design the ball stud or post is received within the slotted receiver, which as used herein locates the trailing end 26 within the pocket 23. Once the trailing edge 26 has been properly located, the roof panel 20 may be leaned against and secured to a wall 22S of the compartment 22 using a suitable engagement feature, e.g., a hook and loop or channel, a wall strap, or any other suitable structure.

The removable roof panel 20 described above is intended to help an operator stow the roof panel 20 in the compartment 22 by providing direct lighting of the first and second locator features 40 and 140. Additionally, in certain embodiments the roof panel 20 may be configured to provide other task lighting, such as by illuminating a path to the rear (R) of the vehicle 10 as noted above, and/or to act as a light guide prompting the operator as to the proper position and/or orientation of the roof panel 20 during the stowing process.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A removable roof panel for a vehicle body, the removable roof panel comprising:
   an outer panel;
   a perimeter frame connected to the outer panel, and having a first locator feature configured to engage a second locator feature of the vehicle body;
   a plurality of latching handles connected to the perimeter frame, and operable for latching and unlatching the perimeter frame from the vehicle body;
   a lamp connected to the perimeter frame proximate the first locator feature;
   a battery electrically connectable to and operable for energizing the lamp; and
   a lamp actuator configured to selectively connect the lamp to the battery when the removable roof panel is removed from the vehicle body to thereby illuminate the first and second locator features during stowing of the removable roof panel in a compartment of the vehicle body.

2. The removable roof panel of claim 1, wherein the lamp includes a plurality of lamps positioned in proximity to an edge of the perimeter frame.

3. The removable roof panel of claim 2, wherein the plurality of lamps includes a plurality of light-emitting diodes.

4. The removable roof panel of claim 3, wherein the plurality of light-emitting diodes includes color-changing light-emitting diodes that illuminate in a first color when the removable roof panel is removed from the vehicle body and a second color when the removable roof panel is in a predetermined position or orientation within the compartment of the vehicle body.

5. The removable roof panel of claim 1, wherein the first locator feature includes a ball stud or post.

6. The removable roof panel of claim 1, wherein the lamp actuator includes a switch that closes to disconnect the lamp from the battery and opens to connect the lamp to the battery.

7. The removable roof panel of claim 1, wherein the lamp actuator includes a sensor operable for detecting a predetermined position or orientation of the removable roof panel, and for selectively connecting the lamp to the battery after the removable roof panel is removed from the vehicle body and the predetermined position or orientation of the removable roof panel is detected.

8. The removable roof panel of claim 1, wherein the lamp actuator is configured to selectively disconnect the lamp from the battery after a calibrated duration.

9. A vehicle comprising:
   a vehicle body defining a compartment; and
   a roof panel that is removable from the vehicle body and stowable in the compartment, and that includes:
      an outer panel;
      a perimeter frame connected to the outer panel, and having a first locator feature configured to engage a second locator feature in the compartment;
      a plurality of latching handles operatively connected to the perimeter frame, and operable for latching and unlatching the perimeter frame from the vehicle body;
      a lamp connected to the perimeter frame proximate the first locator feature;
      a battery electrically connectable to and operable for energizing the lamp; and
      a lamp actuator configured to selectively connect the lamp to the battery when the removable roof panel is removed from the vehicle body to thereby illuminate the first and second locator features during stowing of the removable roof panel in the compartment.

10. The vehicle of claim 9, wherein the lamp includes a plurality of lamps positioned in proximity to an edge of the perimeter frame.

11. The vehicle of claim 9, wherein the plurality of lamps includes a plurality of light-emitting diodes.

12. The vehicle of claim 11, wherein the plurality of light-emitting diodes includes color-changing light-emitting diodes that illuminate in a first color when the removable roof panel is removed from the vehicle body and a second color when the removable roof panel is in a predetermined position or orientation within the compartment.

13. The vehicle of claim 9, wherein the lamp actuator includes a switch that closes to disconnect the lamp from the battery and opens to connect the lamp to the battery.

14. The vehicle of claim 9, wherein the lamp actuator includes a sensor operable for detecting a predetermined position or orientation of the removable roof panel, and for selectively connecting the lamp to the battery after the removable roof panel is removed from the vehicle body and the predetermined position or orientation of the removable roof panel is detected.

15. The vehicle of claim 9, wherein the lamp actuator is configured to selectively disconnect the lamp from the battery after a calibrated duration.

16. The vehicle of claim 9, wherein the first locator feature includes a ball stud or post and the second locator feature includes a slotted receiver.

17. The vehicle of claim 9, wherein the roof panel and a floor of the compartment form an obtuse angle with respect to a rear surface of the vehicle body when the roof panel is stowed within the compartment.

* * * * *